(No Model.)

H. H. KURTZ.
NUT LOCK.

No. 406,842.  Patented July 9, 1889.

Witnesses
Geo. A. Lane
Dewl. H. Herr

Inventor
Harry H. Kurtz
By his Attorney Wm. R. Gerhart

UNITED STATES PATENT OFFICE.

HARRY H. KURTZ, OF SALISBURY, PENNSYLVANIA, ASSIGNOR OF ONE-HALF TO JOSEPH H. BAIR, OF SAME PLACE.

NUT-LOCK.

SPECIFICATION forming part of Letters Patent No. 406,842, dated July 9, 1889.

Application filed August 1, 1888. Serial No. 281,620. (No model.)

*To all whom it may concern:*

Be it known that I, HARRY H. KURTZ, a citizen of the United States, residing at Salisbury, in the county of Lancaster and State of Pennsylvania, have invented certain Improvements in Nut-Locks, of which the following is a specification.

My invention relates to improvements in that class of nut-locks used on the spindles of the axles of vehicles and for like purposes.

This invention consists in a locking-arm hinged to the nut, which, when the nut is turned home on the spindle, is brought into engagement with grooves in the ends of the spindle and nut to lock the latter in place, with a face-plate secured to the front of the locking-arm in position to cover the end of the nut and spindle when the locking-arm is closed.

The invention is fully illustrated in the accompanying drawings, in which—

Figure 1:
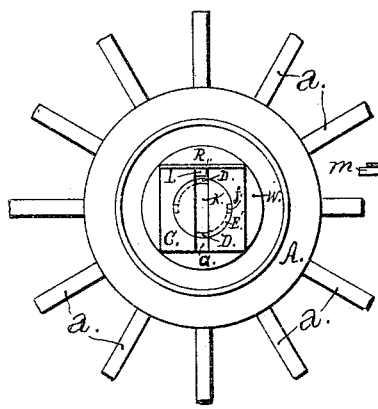
Figure 2:
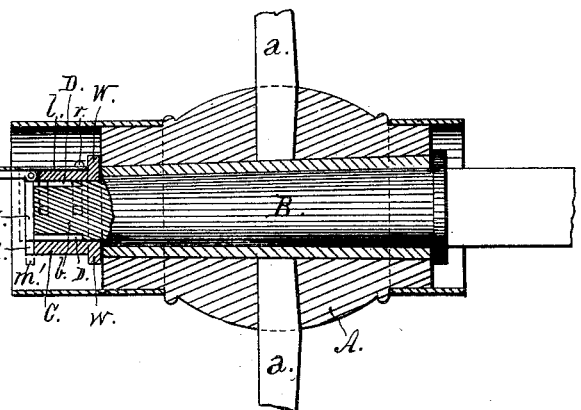
Figure 3:
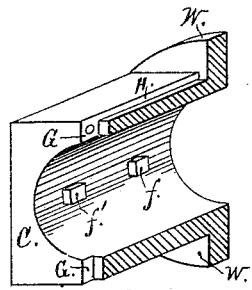
Figure 4:
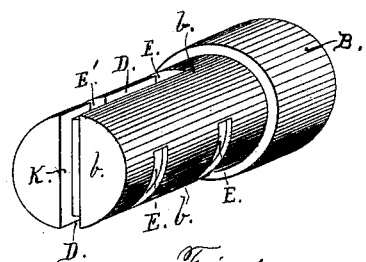
Figure 5:
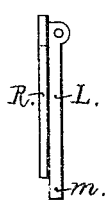
Figure 6:
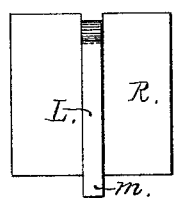
Figure 7:
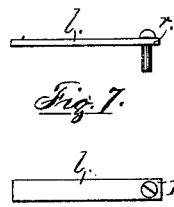
Figure 8:
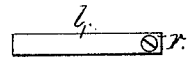

Figure 1 is a front view of a spindle and hub with my invention attached, the locking-arm being open to show the grooves in the face of the nut and end of the spindle. Fig. 2 is a longitudinal view showing the hub, nut, and end of the spindle in section, the locking-arm being in disengagement with the grooves. Fig. 3 is a perspective view of a section of the nut, showing the location of the lugs. Fig. 4 is a perspective view of the spindle. Fig. 5 is a side view of the locking-arm, and Fig. 6 an end view of the same taken from the rear. Fig. 7 is a side view of the hinge-spring, and Fig. 8 a top view of the same.

In the drawings, A represents the hub of a wheel, and *a* the spokes.

B is the spindle, the end *b* of which is made to receive a nut C of peculiar construction. In this spindle longitudinal grooves D, on opposite sides thereof, run back from the end. Leading from each of these grooves D there are circumferential grooves E E', extending partially, but equal distances, around the spindle.

C represents the nut, having lugs *f f'* in the opening through the same, located to engage the grooves D as said nut is pushed onto the spindle. When the lugs *f* reach the ends of grooves D, the inward movement of the nut is arrested and the lugs *f f'* are opposite the entrances into the grooves E E'. The nut is then turned until the lugs are brought into contact with the ends of the circumferential grooves.

Upon its front and one of its side faces the nut is provided, respectively, with transverse and longitudinal grooves G and H, lying in the same plane and at right angles to each other. When the nut is locked, these grooves coincide with a groove K, cut diametrically across the face of the spindle.

In the longitudinal groove H there is a spring *l*, hinged at *r*, near the face of the washer W, which extends outward to the end of the spindle. At the outer end of this groove there is a locking-arm L pivoted. When the grooves in the nut coincide with that in the face of the spindle, this arm L is turned down into engagement with them, locking the nut in position. The spring serves to hold the arm in position when locking the parts together by its pressure thereupon, and when the arm is thrown upward the action of the spring also prevents the arm from falling accidentally. To the outer edge of the arm L a face-plate R is rigidly secured. This plate is of such size and shape as to effectually protect the face of the nut and spindle from all dust or dirt when the arm is in engagement, locking the said nut and spindle together.

The nut has a washer W, formed integral with it on its inner end, as is common with nuts used for this purpose, and in a recess *r* in this washer the spring S is secured. To permit the locking-arm to be more readily opened when in the locking position, the arm *l* thereof projects beyond the edge of the nut, as shown at *m*, Fig. 2. The circumferential grooves are cut around the spindle in the direction in which the wheel revolves when the vehicle is moving forward, thus tending to keep the nut locked and avoiding with such movement any strain on the locking-arm L. Grooves D and E E' of the spindle and the lugs in the nut are so arranged that when the nut is locked in place, the lugs bearing against the ends of the grooves E E', the grooves G and H of the nut coincide with the groove K in the end of the spindle.

In putting the nut on it is pushed straight back, the lugs $f$ $f'$ sliding in the grooves D. When the lugs $f$ reach the ends of those grooves, the nut is turned until the said lugs, traveling in the grooves E E', strike the ends thereof. The locking-arm is then pushed down in place.

Having thus described my invention, what I claim as new, and desire to secure by Letters Patent, is—

The combination, with the spindle provided with a groove across the end thereof, of a nut having a groove cut across its front face and adapted to register with the groove in the end of the spindle, a locking-arm pivoted in one end of the groove in the nut and constructed to engage with it and the groove in the spindle when they register with each other, and a face-plate rigidly secured to the front of the locking-arm, so as to cover the front of the spindle and nut, substantially as and for the purpose specified.

HARRY H. KURTZ.

Witnesses:
GEO. A. LANE,
WM. R. GERHART.